United States Patent
Dohring

(10) Patent No.: US 9,828,777 B2
(45) Date of Patent: Nov. 28, 2017

(54) FLOOR PANEL FOR OUTDOORS

(71) Applicant: Kronoplus Technical AG, Niederteufen (CH)

(72) Inventor: Dieter Dohring, Grossenhain (DE)

(73) Assignee: Kronoplus Technical AG, Niederteufen (CH)

( * ) Notice: Subject to any disclaimer, the term of this patent is extended or adjusted under 35 U.S.C. 154(b) by 0 days.

(21) Appl. No.: 14/426,207

(22) PCT Filed: Oct. 5, 2012

(86) PCT No.: PCT/EP2012/069704
§ 371 (c)(1),
(2) Date: Mar. 5, 2015

(87) PCT Pub. No.: WO2014/053186
PCT Pub. Date: Apr. 10, 2014

(65) Prior Publication Data
US 2015/0233127 A1 Aug. 20, 2015

(51) Int. Cl.
*E04F 11/16* (2006.01)
*E04F 15/00* (2006.01)
(Continued)

(52) U.S. Cl.
CPC .......... *E04F 15/02183* (2013.01); *B32B 3/06* (2013.01); *B32B 5/022* (2013.01);
(Continued)

(58) Field of Classification Search
CPC .......... E04F 15/02183; E04F 15/02038; E04F 15/02172; B32B 3/06; B32B 13/02;
(Continued)

(56) References Cited

U.S. PATENT DOCUMENTS 4,180,615 A   12/1979  Bettoli
4,707,961 A * 11/1987  Nunley .................. E04D 11/02
                                                          156/71
(Continued)

FOREIGN PATENT DOCUMENTS

CA     2 235 542 C    8/2006
CN     1070930 A      4/1993
(Continued)

OTHER PUBLICATIONS

Search Report for corresponding European Patent Application No. 15158991 dated Aug. 14, 2015.
(Continued)

*Primary Examiner* — Chi Q Nguyen
(74) *Attorney, Agent, or Firm* — Renner, Otto, Boisselle & Sklar, LLP

(57) ABSTRACT

The present invention relates to floor panels for outdoor use, which front side is provided with a decorative—respectively protective layer and which comprises at its sides coupling means inform of groove and tongue elements. The material of the carrier plate is thereby MDF or HDF board of acetylated wood, a fiber cement board or is based on polyvinylchloride and the decorative—respectively protective layer consisting of a radiation cured acrylate-containing film or a polymeric layer with hardness gradient, wherein the hardness of the polymeric layer decreases in particular continuously with increasing depth seen from the surface of the polymeric layer.

20 Claims, 2 Drawing Sheets

(51) Int. Cl.

| | | |
|---|---|---|
| E04F 15/02 | (2006.01) | |
| B32B 7/12 | (2006.01) | |
| B32B 13/02 | (2006.01) | |
| B32B 13/12 | (2006.01) | |
| B32B 27/08 | (2006.01) | |
| B32B 27/16 | (2006.01) | |
| B32B 27/30 | (2006.01) | |
| B32B 21/02 | (2006.01) | |
| B32B 21/08 | (2006.01) | |
| B32B 5/02 | (2006.01) | |
| B32B 3/06 | (2006.01) | |
| B32B 13/08 | (2006.01) | |
| B32B 21/06 | (2006.01) | |
| B32B 27/10 | (2006.01) | |
| B44F 9/02 | (2006.01) | |
| B44F 9/04 | (2006.01) | |
| E04C 2/20 | (2006.01) | |
| E04C 2/24 | (2006.01) | |

(52) U.S. Cl.
CPC ............... *B32B 7/12* (2013.01); *B32B 13/02* (2013.01); *B32B 13/08* (2013.01); *B32B 13/12* (2013.01); *B32B 21/02* (2013.01); *B32B 21/06* (2013.01); *B32B 21/08* (2013.01); *B32B 27/08* (2013.01); *B32B 27/10* (2013.01); *B32B 27/16* (2013.01); *B32B 27/304* (2013.01); *B32B 27/308* (2013.01); *B44F 9/02* (2013.01); *B44F 9/04* (2013.01); *E04C 2/20* (2013.01); *E04C 2/24* (2013.01); *E04F 15/02038* (2013.01); *E04F 15/02172* (2013.01); *B32B 2255/10* (2013.01); *B32B 2255/26* (2013.01); *B32B 2260/028* (2013.01); *B32B 2260/046* (2013.01); *B32B 2419/04* (2013.01)

(58) Field of Classification Search
CPC ....... B32B 13/12; B32B 5/022; B32B 27/304; B32B 21/08; B32B 21/02; B32B 2260/046; B32B 2255/26; B32B 2419/04; E04C 2/20; E04C 2/24
USPC ..... 52/309.5, 588.1, 177, 578, 309.1, 741.3, 52/741.4; 428/423.1, 500, 60, 195.1; 156/275.5, 273.3, 273.5, 277; 427/407.1, 427/466
See application file for complete search history.

(56) References Cited

U.S. PATENT DOCUMENTS

| | | | | |
|---|---|---|---|---|
| 4,783,942 | A * | 11/1988 | Nunley | E04D 13/1681 52/309.1 |
| 4,785,065 | A * | 11/1988 | Uhl | D06P 5/004 524/548 |
| 5,458,953 | A | 10/1995 | Wang et al. | |
| 5,958,563 | A * | 9/1999 | Harwood | B29C 47/0019 264/173.12 |
| 6,103,352 | A | 8/2000 | Takahashi | |
| 6,933,043 | B1 * | 8/2005 | Son | B32B 27/08 428/213 |
| 7,678,466 | B2 | 3/2010 | Nam | |
| 8,865,267 | B2 | 10/2014 | Dohring et al. | |
| 8,952,078 | B2 * | 2/2015 | Gould | C09D 11/101 106/31.13 |
| 2002/0160680 | A1 | 10/2002 | Laurence et al. | |
| 2004/0211144 | A1 * | 10/2004 | Stanchfield | E04F 15/02 52/578 |
| 2005/0176321 | A1 * | 8/2005 | Crette | B32B 5/24 442/103 |
| 2005/0208255 | A1 * | 9/2005 | Pervan | B32B 21/02 428/60 |
| 2005/0250921 | A1 * | 11/2005 | Qiu | C08F 220/24 526/247 |
| 2007/0154840 | A1 * | 7/2007 | Thies | B29C 67/0055 430/270.1 |
| 2007/0218252 | A1 * | 9/2007 | Donald | B29C 39/006 428/143 |
| 2008/0153609 | A1 * | 6/2008 | Kotler | E01C 13/045 472/92 |
| 2009/0110888 | A1 * | 4/2009 | Wuest | B32B 27/28 428/200 |
| 2009/0162602 | A1 * | 6/2009 | Cottier | C04B 28/02 428/99 |
| 2009/0186710 | A1 * | 7/2009 | Joseph | E04F 15/16 472/64 |
| 2009/0193748 | A1 * | 8/2009 | Boo | B27F 1/02 52/589.1 |
| 2009/0272058 | A1 * | 11/2009 | Duselis | B32B 13/02 52/309.17 |
| 2010/0009170 | A1 | 1/2010 | Wedel et al. | |
| 2010/0311854 | A1 | 12/2010 | Thiers et al. | |
| 2011/0001420 | A1 * | 1/2011 | Tchakarov | H01L 51/5212 313/355 |
| 2011/0120037 | A1 * | 5/2011 | Barlow | B44C 1/28 52/309.1 |
| 2011/0296780 | A1 | 12/2011 | Windmoeller | |
| 2012/0276369 | A1 * | 11/2012 | Jing | B82Y 30/00 428/331 |
| 2012/0276381 | A1 * | 11/2012 | Cypcar | B32B 43/006 428/355 N |
| 2014/0150962 | A1 * | 6/2014 | Rule | C09J 5/06 156/256 |
| 2014/0274633 | A1 * | 9/2014 | Tilton | D21H 19/22 493/82 |
| 2015/0064421 | A1 | 3/2015 | Döhring | |

FOREIGN PATENT DOCUMENTS

| | | | | |
|---|---|---|---|---|
| CN | 1206374 | A | 1/1999 | |
| CN | 1972799 | A | 5/2007 | |
| CN | 101827691 | A | 9/2010 | |
| CN | 102639326 | A | 8/2012 | |
| DE | 3003010 | A1 * | 9/1981 | ......... E04F 13/0862 |
| DE | 203 14 719 | U1 | 3/2005 | |
| DE | 10 2006 029963 | A1 | 1/2008 | |
| DE | 20 2007 016185 | | 4/2008 | |
| DE | 20 2010 001 884 | U1 | 7/2010 | |
| DE | 20 2011 104 092 | U1 | 2/2012 | |
| DE | 20 2012 100 659 | U1 | 5/2012 | |
| EP | 1 262 607 | A1 | 12/2002 | |
| FR | 2937345 | A1 | 4/2010 | |
| RU | 2 426 604 | C2 | 8/2011 | |
| WO | 2007/115379 | A1 | 10/2007 | |
| WO | 2008/000486 | A1 | 1/2008 | |
| WO | 2008/061765 | A1 | 5/2008 | |
| WO | 2009/050565 | A1 | 4/2009 | |
| WO | 2010/037733 | A1 | 4/2010 | |
| WO | 2013/149644 | A1 | 10/2013 | |
| WO | WO 2013/149680 | A1 | 10/2013 | |
| WO | 2013/185814 | A1 | 12/2013 | |

OTHER PUBLICATIONS

International Preliminary Report on Patentability and Written Opinion with translation for corresponding patent application No. PCT/EP2012/069704 dated Apr. 5, 2015.

International Search Report for corresponding patent application No. PCT/EP2012/069704 dated Jun. 21, 2013.

Office Action for corresponding Chinese Patent Application No. 201280076271.4 dated Dec. 22, 2015.

Extended European Search Report for corresponding Patent Application No. 16157632.7 dated May 31, 2016.

Decision to Grant for corresponding Russian Patent Application No. 2015112933/05 dated Jul. 6, 2016 and its English translation.

Official Action for corresponding Chinese Patent Application No. 201280076271.4 dated Sep. 9, 2016 and its English translation.

(56) References Cited

OTHER PUBLICATIONS

European Search Report for corresponding Patent Application No. 16189200.5 dated Dec. 22, 2016.
Official Action for corresponding Chinese Patent Application No. 201280076271.4 dated Sep. 27, 2017.

* cited by examiner

FLOOR PANEL FOR OUTDOORS

FIELD OF THE INVENTION

The present invention relates to improved floor panels for outdoor use that can be provided in very flexible art with decorative decors as well as an installing method for such floor panels.

BACKGROUND OF THE INVENTION

Many types of panels for floor coverings are known from the state-of-the-art. For the outdoor use, i.e. outside of enclosed rooms, where floors are more or less unprotectedly exposed to weather influences, typically solid wood planks are used, that are impregnated suitably. Such solid wood planks exist in different quality and price levels, wherein in particular tropical woods are preferred for the outdoor use, since those provide particular good weather-resistant properties. However tropical woods are relatively expensive and are suspected to be less environmentally friendly, since a sustained forest industry is often not given in the countries of origin.

For the indoor use, so-called laminate panels have widely spread in the recent years. Laminate panels are relatively inexpensive and have good installing properties. Usually, they are based on a carrier plate of MDF or HDF material, on which surface (front side) several resin-impregnated papers are applied, in particular a decorative paper, as well as a protective overlay paper. To increase the abrasion resistance of the surface resins, such as amino resins are provided with abrasion resistant particles, such as in particular aluminum oxide particles. However, such laminate panels are not suitable to being used in an outdoor area. The carrier plate of MDF or HDF is not moisture-resistant and will inevitably expand due to moisture in the outdoor area. Typically used décor, papers have no sufficient UV-resistance, so that the printings will fade over time, so that the décor will become unsightly after a short time period. Further, the acrylate, respectively melamine resin surfaces do not satisfy the high requirements due to outdoor exposure without any specific modifications.

According to a further development of such laminate panels, so-called direct imprinted panels, were developed. In such direct imprinted panels, usually no papers are used, in particular no décor papers. The décor layer that is a real wood imitation in most cases is directly imprinted on the surface of the panel which is therefore grounded with a suitable primer using emulsion paint in a deep printing process. Document WO2008/061791A1 of the same applicant is a further development of this known state of the art. The disclosure of this document is herewith incorporated by reference. The core of the improvement of this document is that on the surface of a panel two liquid polymer layers are applied wet in wet, so that a partial mixing of the coating mediums takes place. Those two wet in wet coated layers are then cured together, wherein the resulting cured coating has a hardness gradient due to the partial mixing, whereby the hardness of the coating decreases with increasing depth seen from the surface of the resulting coating.

The above-described laminate or direct imprinted panels share the same advantage that the use of so-called click-connecting profiles is possible, in particular specific groove and tongue connecting profiles along the length edge of the panels that allow a simple interlocking by an angle of movement around the interlocking profiles, so that installing the panels is also possible for ordinary persons. Further, the desired décor can be chosen completely freely, since it is imprinted. Therefore, for example, any type of wood can be imitated as well as stone or tile surfaces. The known laminate or direct imprinted panels have in common that they are not suitable for use in the outdoor area. Therefore, it is an object of the present invention to improve the known prior art and in particular to provide improved floor panels for outdoor use that combine the advantages of known laminate panels with respect to flexibility of the décor and simplicity of the installation and with robustness and resistance of real wood planks for the outdoor use. This and other objects that will become apparent during the reading of the following description or that will be recognized by a person skilled in the art are solved with a floor panel according to claim 1 and the use according to claim 19.

DETAILED DESCRIPTION OF THE INVENTION

A floor panel for outdoor use according to the invention comprises a carrier plate having a front side and a rear side, wherein the carrier plate is provided on its front side with a decorative layer respectively a protective layer. Outdoor use means herein the use outside of enclosed rooms, in which the floor panels are at least partially exposed to the weather such as in particular the use on balconies or terraces of buildings. The front side is the one side that is directed upwards in the installed state of the panels, hence the step side or used side, and the rear side is the opposite side of the panel that rests on the ground in the installed state. The carrier plate has at its sides, i.e. in particular at its longitudinal and cross edges coupling means in form of groove and tongue elements. Such groove and tongue elements are known from the technology of laminate floor manufacturing and allow a connection of several uniform panels in directions parallel to the front side as well as perpendicular to the front side by form fit. Therefore, complementary coupling means are provided on each opposing edge of the plate, i.e. one side a tongue and on the opposite side of the plate a corresponding groove is incorporated. According to the invention, the carrier plate is characterized in that, that it consists of a MDF or HDF plate of acetylated wood, a fiber cement board or of PVC (polyvinylchloride). Those materials are well-suited for the outdoor use and are weather resistant, in particular with respect to moisture. The decorative respectively protective layer consists either of radiation cured acrylate containing film or of a polymeric layer having a hardness gradient, where the hardness of the polymeric layer decreases with increasing depth of the surface of the polymeric layer seen from the surface of the polymeric layer.

MDF or HDF boards of acetylated wood are particularly preferable. Acetylated wood is known generally in the art. During the acetylating process, wood respectively wood fibers, of which the MDF respectively HDF boards are formed, are treated in a chemical process with acetic anhydride. Thereby, the cell structure of the wood is permanently changed and in particular the absorption of moisture of the so treated wood fibers is significantly reduced. MDF or HDF boards that are formed of such treated wood are surprisingly resistant to weather and well-suited to be used in the outdoor area together with the means on the front side of the plate according to the invention. Also general suitable are fiber cement boards that are known under the trade name Eternit of a provider. Fiber cement boards can be processed easily and in particular be provided on their sides with the coupling means necessary. Finally, the inventors have noticed that carrier plates based of PVC are also suitable in combination with the inventive décor , respectively protective layer.

The decorative respectively protective layer can consist of a radiation cured polyacrylate-containing film according to the invention. The film is in particular paper-based and impregnated or coated with a radiation curing acrylate system. A radiation curing can be affected, for example, by treatment with electron rays or UV rays. Such films are, for example, commercially available under the trade name Elsco of the company DTS Systemoberflächen GmbH. It was shown that as an alternative to this special film, also a polymeric layer with a hardness gradient provides the required weather resistant properties that are required for a floor panel for the outdoor use. The manufacturing of a polymeric layer with a hardness gradient according to the present invention is for example described in detail in the WO2008/061791 of the same applicant as mentioned at the beginning. From the above it will become apparent that the decorative respectively protective layer is not inevitably a single layer, but can comprise multiple different layers that act together to provide a protective function respectively a decorative function.

In use of a film for the decorative respectively protective layer, said layer is preferably adhered to the front side of the carrier plate by means of an adhesive (FIG. 1, element 17) and in particular by the means of a polyurethane adhesive (such as polyurethane melting adhesive). Polyurethane adhesives are in particular suitable and improve the resistance of the composite in respect to weather influences. In all embodiments described herein it is preferred that the film itself is imprinted with a decorative pattern such as a real wood décor or a stone or tile décor. Alternatively, it is also possible to use the film without an own decorative décor, so that these serve as pure protective layers. According to the invention, fiber-cement boards are provided on the rear side with a waterproof layer to block the penetration of water. Fiber-cement boards provide a very high density. The one-sided penetration of small amounts of water results in curving the panels to the topside, wherein the optical installation appearance is distorted. The sealing of the rear side can be achieved by acrylic coating, a PVC film can be concealed by polyurethane melt adhesive, a glass non-woven provided with polyurethane adhesive provides a particularly robust protection.

Preferably, the front side of the carrier plate under the film respectively the polymeric layer is provided with a primer. Such a primer can improve the durability of the film, respectively the polymeric layer on the carrier plate. In particular in the case of a polymeric layer as decorative respectively protective layer it is preferred that the primer itself is imprinted with a décor . Over this imprinted primer the polymeric layer having a hardness gradient is provided. Since the polymeric layer is essentially transparent in the cured state, the floor panel is provided as desired with an aesthetic attractive surface. A floor panel with a polymeric layer with hardness gradient can, for example, be manufactured by the following method. In the first step, the carrier plate of MDF or HDF of acetylated wood, a fiber cement board or a polyvinylchloride is provided. On this carrier plate an undercoat layer is then applied and thereon a decorative pattern is imprinted. After the imprinting of the decorative pattern, a first polymeric layer is applied on the undercoat layer on the still wet first polymeric layer a second (that is different from the first) polymeric layer is applied, so that partial mixing of the coating means will take place. The curing of the undercoat layer as well as the polymeric layers can take place in one method step. The curing or hardening of a polymeric layer will be understood as a chemical reaction that takes place during polymerization. This has to be distinguished from drying of such layers, in which simply the content of water will be reduced or removed.

In a more preferred embodiment of the invention a primer layer is provided on the carrier plate or coated under the undercoat layer. The primer layer or also called adhesion promoting layer improves thereby the adhesion of the undercoat layer on the carrier material. The person skilled in the art knows therefore a series of suitable primer materials that are commercially available from respective chemical contractors. More preferred a polymerizable printing paint (ink) is used to imprint the decorative pattern on the undercoat, in particular based on polymerizable acrylic resins and/or N-vinylcaprolactam (a liquid reactive thinner), such as it is, for example, available from the company BASF.

Generally, according to the prior art, printing inks for manufacturing of laminate floors are emulsion inks consisting of known pigment mixtures and binders based on Caseins or acrylic binders that are known to the person skilled in the art. Such emulsion inks are generally used in typical deep printing processes. Emulsion inks are printing inks that consist usually of three main components, in particular (a) a solvent (typically water) (b) a binder in form of a plastic polymer (acrylate) that assemble when the solvent evaporates and form a solid layer, as well as (c) color pigments to achieve the desired cover and view. The drying of those emulsion inks is therefore not achieved by polymerization, but by evaporation of the solvent, since the binders are already present as polymers. The polymers contained in the dispersion assemble during liquefaction of the binder in a free physical art and form a solid, closed layer.

The applicants have surprisingly noticed that improved adhesion properties of the layer system can be achieved and a suitable weather resistance and therefore suitability for the outdoor use can be achieved, if not the usual emulsion inks are used but instead polymerizable printing inks. This is in particular valid for the preferred application with a polymeric layer, in particular with hardness gradient. The positive effect is in particular distinctive if the printing ink and the polymeric layer are cured, respectively polymerized together (printing ink and polymeric layer can be regarded in this case together as decorative layer respectively protective layer, since they cannot be separated functionally). As mentioned above, the curing of a polymeric layer respectively a polymerizable printing ink (as polymerizable acrylate respectively UV-reactive colors in general) is understood as chemical reaction that takes place during polymerization. This has to be distinguished from the drying of such layers, on which solely the solvent such as the water content of the printing ink respectively the polymeric layers evaporates or is reduced on pure physical art.

Due to the common curing (polymerization) of the polymerizable components (acrylate system and/or a N-vinylcaprolactam) of printing ink and polymeric layer a chemical cross-linking of both layers is achieved at the boundary surface which is assumed that it is responsible for the improved adhesion of the layers and therefore for the excellent weather resistance properties. The commonly used emulsion printing inks do not provide polymerizable components so that such a chemical cross-linking between printing ink and polymeric layer will not take place. Polymerizable components, as preferably used in the present invention comprise main components acrylates, such as in particular acrylate monomers, oligomers and optional photo initiators as well as a N-vinylcaprolactam as liquid reactive thinner. N-vinylcaprolactam can be added to the printing ink additionally to the acrylate thinner and polymerizes together with those. Alternatively, it is possible to dispense the acrylates and to provide an accordingly higher amount of N-vinylcaprolactam, since the N-vinylcaprolactam can be polymerized itself. Details hereto are known to the person skilled in the art, for example, from the German publication DE 197 02 476 A1. In preferred embodiments, the polymerizable components consist essentially of N-vinylcaprolactam. Before the initiators cause under the influence of radiation a polymerization of the polymers or oligomers so that the printing ink is cured rapidly.

As described above, generally preferred for the present invention the used printing inks are polymerizable printing inks and in particular polymerizable acrylate systems. Polymerizable printing inks contain as main component binders, respectively resins that contain reactive double bindings; polymerizable components in form of monomers respectively oligomers, such as, for example, acrylate monomers and acrylate oligomers; optional photo initiators for radiation curable printing inks; additives such as the above-mentioned N-vinylcaprolactam, defoamer, extending additives, thickeners, inter-alia; color pigments such as phthalocyanine pigments, azoic dyes, indigoid dyes, black dyes and/or carbon black; as well as fillers for obtaining certain physical, technical properties. Generally preferred, the printing inks used for the present invention are further radiation curable, such as in particular through UV-radiation curable (UV-curable) printing inks. More preferred, the printing ink is a UV-curable, polymerizable acrylate system.

Preferably the undercoat is based on an aqueous dispersion (preferred of an aqueous acrylate system), which has a suitable composition so that it can be coated with a curtain coating method. It has been surprisingly found that the use of aqueous dispersions even on plastic surfaces, in particular on PVC-surfaces, achieves satisfactory adhesive properties. According to the prior art, the undercoat was applied on the surface of the carrier layer by means of a roller coating process. In such roller coating methods the coating material (the undercoat) is dispensed directly from the roller on the surface to be coated or indirectly over a coating tape that is pressed on the component to be coated via a press roll. The inventors of the present application have noticed that surfaces that were produced in this art and in particular with finely detailed printings, as they are typically necessary for imitating real wood surfaces, will not achieve the actually expected resolution and sharpness. In particular, the use of preferred polymerizable printing inks often leads to disturbing bands in the print image. The inventors have surprisingly noted that those problems can be avoided if, instead of a roller coating method, a curtain coating method is used. It is assumed that the rollers of the roller coating method either, in the case that the coating material is applied directly from the roller on the surface to be coated or indirectly over a coating tape, due to their roundness a minimal waviness of the surface is achieved in the transferred coating. The mountains and valleys of this wavy surface are, however, so small that the so produced surfaces can be imprinted with known emulsion inks. However, it is assumed that this very small unevenness of the such-coated surfaces during the use of polymerizable printing inks is responsible for the mentioned problems. In any case, the undesired stripe building when polymerizable printing inks are used (in particular polymerizable acrylate systems) can be effectively avoided by pouring the undercoat.

Curtain coating methods and respective systems are known to the person skilled in the art from the prior art (e.g. from EP1252937 A1), so that a detailed description of the same can be ommited. Important is that liquid curtain of coating material is produced in the curtain coating method through which the component to be coated is lead. A coating via rollers will not take place.

In a preferred embodiment, the undercoat layer provides a surface mass between 15 g/m2 to 150 g/m2, preferably a surface mass between 30 g/m2 to 100 g/m2, more preferably a surface mass between 40 g/m2 and 70 g/m2 and most preferably a surface mass between 50 g/m2 to 75 g/m2. This surface mass leads in a preferred embodiment to a thickness of the underground coating between 5 µm and 300 µm, preferably between 15 µm and 200 µm, more preferably between 20 µm and 180 µm and most preferably between 25 µm and 100 µm. It has been found that these surface masses, respectively thicknesses of the undercoat layer provide an optimal covering for the thereon imprinted decorative pattern.

The overall thickness of the polymeric layer after curing should provide a thickness of 20 µm-300 µm, more preferably from 40 µm-250 µm, even more preferably from 50 µm-220 µm and most preferably from 60 µm-180 µm.

Preferred materials for the polymeric layers are 1.6-hexandioldiacrylate, polyesteracrylate, polyurthan acrylic acid ester and dipropylendicyclodiacrylate.

To increase the durability of the floor panels, it is further preferably provided that the film respectively the polymeric layer contains additives in form of UV-absorbents and/or radical interceptors. The UV-absorbents should be preferably applied in suitable amounts respectively qualities, so that at least 99% UV-blocking can be achieved. Commercially available radical interceptors shall significantly slow down the thermal oxidative attack of the polymeric layers, in particular through the influence of solar radiation.

More preferred is, if the floor panels comprise at the edges of the front side bevels, so that in the installed state of two adjacent panels a V- or U-shaped groove is formed between the panels. At rectangular panels, e.g. the four edges of the panel that are oriented towards the front side are beveled so that during the installation at the abutting edges of two panels such a groove is formed. The groove is advantageous, since occurring unevenness of the underground can be well optically concealed during the installation.

The carrier plate preferably provides a thickness of 3 mm and 20 mm, more preferably between 4 mm and 15 mm, even more preferably between 3 mm and 12 mm and most preferably between 4 mm and 10 mm.

The present invention also relates to a method respectively a use of a panel for producing a floor cover for the outdoor use, in which a plurality of panels, according to the invention, are installed by connecting the panels in an outdoor area. Since the carrier plate of the panels, according to the invention, as mentioned above, is relatively thin, in particular provides a preferred thickness of just 3 mm to 20 mm, the floor underground should be preferably suitably pretreated, to allow an even installation of the different panels. Hereby, it has been found as particularly suitable to provide the floor underground with a layer or a bed of gritting material and to install the panels on this layer of gritting material. As gritting material, e.g. quarry stone or broken mineral compounds with a grain size from 2 mm to 32 mm are used. More preferred is the use of grain sizes that are significantly smaller, namely preferably 3 mm to 25 mm, more preferably from 3 mm to 15 mm and most preferably from 3 mm to 10 mm. The quantity fraction of gritting material particles in these preferred grain size regions should be at least 90%. In other words, at least 90 of 100 gritting particles should be within the preferred region, in order to achieve an even and proper installation of the relatively thin carrier plates. To avoid the exposure to dammed up water of the installed area of floor panels, during the installation of the bed of gritting material, a suitable drainage must be applied.

DESCRIPTION OF PREFERRED EMBODIMENTS

In the following the invention is explained in more detail on the basis of the figures, wherein.

Figure 1:
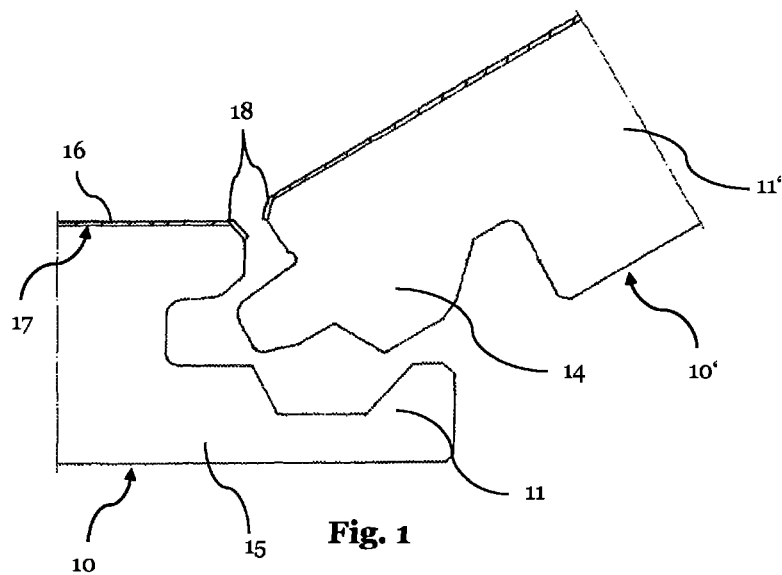
FIG. 1 shows a schematic cut view of the coupling means of two similar floor panels.

In FIG. 1, in a partly cut, schematic view, two similar floor panels 10 and 10' are shown shortly before those are connected with each other. The panels 10 and 10' comprise carrier plates 11, 11', that consist, according to the invention, either of cement fiber boards, polyvinylchloride boards or MDF or HDF boards of acetylated wood. The panels provide at their edges coupling means in form of groove elements 14 and tongue elements 15 that allow connecting a plurality of panels in directions parallel to the front side, as well as perpendicular to the front side by form fit. Thereby, each panel is provided with each of tongue element 14 at a longitudinal edge and a respective groove element 15 at the opposed longitudinal edge. At the cross edges, typically complementary coupling means are provided that allow a connection of two panels by pure lowering. Details of such interlocking profiles are known to the person skilled in the art of the technology of laminate floor production, as e.g. WO0188306 or WO0148332 of the same applicant. As the person skilled in the art can derive from FIG. 2, in which the panels 10 and 10' are shown in the connected state, it is not possible to separate both panels in the shown connected state by horizontal shifting to the left or right in FIG. 2, nor is it possible to disengage the right panel 10' just by pure vertical lifting from the connection to the left panel 10. This engagement of the panels is just possible by means of an angular movement, as implied in FIG. 1. On the front side of the panels, there is provided a decorative, respectively protective layer 16 that can consist, according to the invention, of a radiation-cured acrylate film or of a polymeric layer with hardness gradient. Layer 16 is preferably provided with a decorative pattern, such as a real wood imitate, respectively it is transparent and allows therefore watching the décor placed below, which can be, for example, directly provided on the front side of the carrier plate.

Figure 2:
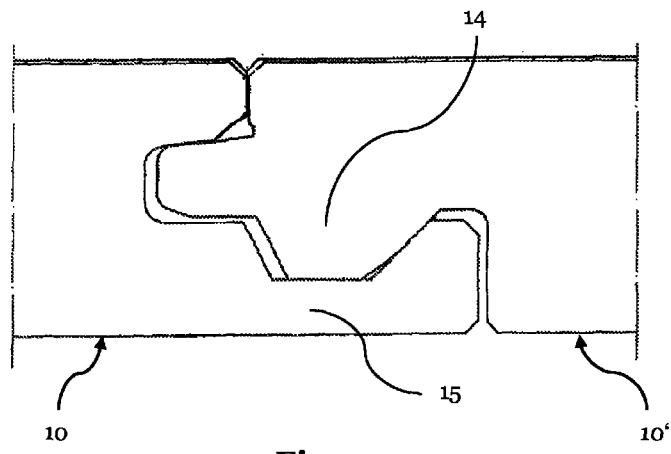
FIG. 2 shows the same panels as FIG. 1 in a connected state.

As further shown in FIGS. 1 and 2, both panels 10 and 10' provide bevels 18 on the edges of the front side, so that in the installed state of two adjacent panels, between the panels 10 and 10', the V-shaped groove is formed. This can be best seen in FIG. 2.

Figure 3:
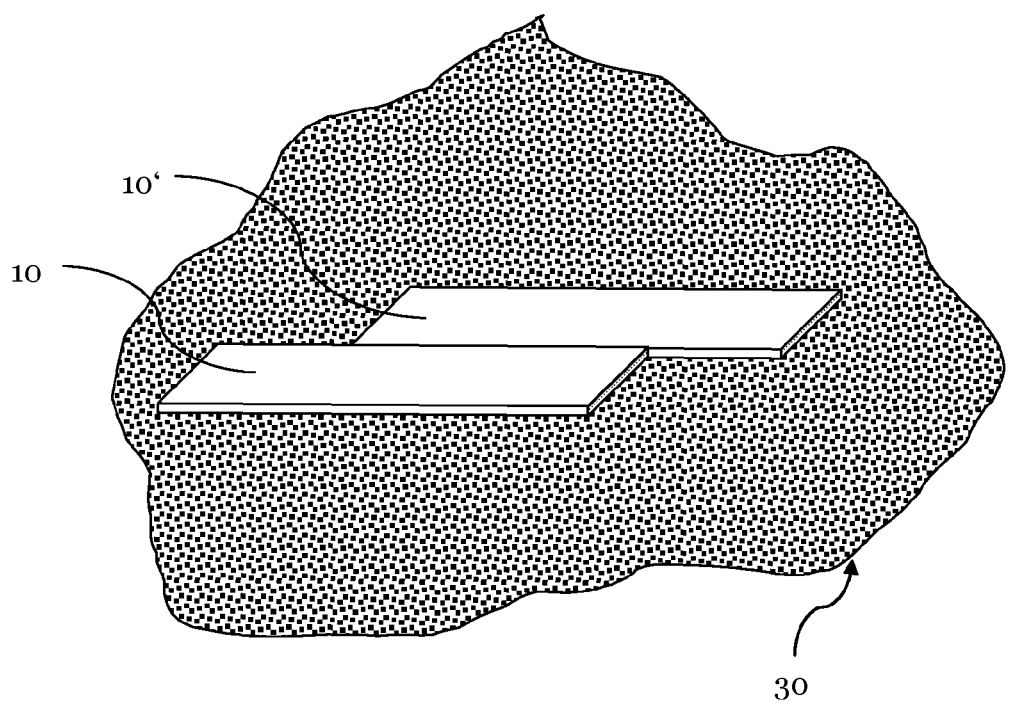
FIG. 3 shows in a schematic illustration, how two similar floor panels are provided on a bed of gritting material.

FIG. 3 shows a schematic view of two panels 10, 10' as they are arranged on a bed of gritting material. The bed of gritting material 30 has, for example, a thickness of 1 cm-20 cm, more preferable from 5 cm-6 cm. The gritting material consists thereby preferably up to 90% (quantitative fraction) of grain sizes from 3 mm-10 mm thickness, so that a particular proper and even installation of the panels 10, 10' is possible.

The invention claimed is:

1. A floor panel for outdoor use, comprising
a carrier plate with a front side and rear side,
a radiation cured acrylate-containing film provided on the front side of the carrier plate,
a polyurethane adhesive interposed between the radiation cured acrylate-containing film and the front side of the carrier plate, the polyurethane adhesive adhering the radiation cured acrylate-containing film to the front side of the carrier plate, and
a polymerizable printing ink, wherein
the polymerizable printing ink and the acrylate-containing film are radiation cured together, and
wherein the carrier plate has sides provided with groove and tongue elements that allow connecting multiple similar panels in directions parallel to the front side as well as perpendicular to the front side by form fit, wherein
the material of the carrier plate is chosen from the group consisting of:
MDF or HDF-board of acetylated wood;
Fiber cement board;
Polyvinylchloride.

2. The floor panel for outdoor use according to claim 1, wherein there is provided a glass non-woven, a waterproof film, or an acrylate coating on the rear side of the fiber cement board.

3. The floor panel for outdoor use according to claim 1, wherein the film is imprinted with a decor.

4. The floor panel for outdoor use according to claim 1, wherein the front side of the carrier plate is provided with an undercoat under the film.

5. The floor panel for outdoor use according to claim 4, wherein the undercoat is imprinted with a printing ink forming a decor.

6. The floor panel for outdoor use according to claim 5, wherein the printing ink comprises at least one of a polymerizable acrylate and n-vinylcaprolactam.

7. The floor panel for outdoor use according to claim 6, wherein the printing ink comprises a polymerizable acrylate and n-vinylcaprolactam with a weight proportion (%) of the printing ink from 2 to 50%.

8. The floor panel for outdoor use according to claim 4, wherein the undercoat is based on an aqueous acrylate-system.

9. The floor panel for outdoor use according to claim 4, wherein the undercoat provides a thickness between 5 and 300 μm.

10. The floor panel for outdoor use according to claim 1, wherein the panel is not provided with abrasion-resistant particles.

11. The floor panel for outdoor use according to claim 1, wherein the film is a paper film and is impregnated with acrylate.

12. The floor panel for outdoor use according to claim 1, wherein the film contains additives in form of at least one of UV-absorbents and radical interceptors.

13. The floor panel for outdoor use according to claim 1, wherein the film contains additives in form of UV-absorbents in such an amount, to achieve at least a 99% UV-blocking.

14. The floor panel for outdoor use according to claim 1, wherein edges the front side of the panel have bevels so that a V- or U-shaped groove is formed between the panel and an adjacent panel.

15. The floor panel for outdoor use according to claim 1, wherein the carrier plate provides a thickness between 3 and 20 mm.

16. A method for making a floor covering for an outdoor area comprising the steps:

providing a plurality of panels according to claim 1;

installing the panels in an outdoor area by interconnecting the panels.

17. The method according to claim 16, wherein the installing step includes installing the panels on a layer of gritting material.

18. The method according to claim 17, wherein the gritting material comprises 90% quantity fraction particle size from 2 to 32 mm.

19. An outdoor area comprising a plurality of panels according to claim 1 that are interconnected by the tongue and groove elements.

20. The floor panel for outdoor use according to claim 1, wherein the polyurethane adhesive is provided as a layer consisting of the polyurethane adhesive.

* * * * *